US012684189B2

(12) United States Patent　(10) Patent No.: US 12,684,189 B2

Chakraborty　(45) Date of Patent: Jul. 14, 2026

(54) WATCH TIME UNITS AND THE REWARD SHARE MECHANISM FOR A USER-GENERATED VIDEO SHARING PLATFORM

(71) Applicant: Adris Chakraborty, New York, NY (US)

(72) Inventor: Adris Chakraborty, New York, NY (US)

( * ) Notice: Subject to any disclaimer, the term of this patent is extended or adjusted under 35 U.S.C. 154(b) by 0 days.

(21) Appl. No.: 18/788,004

(22) Filed: Jul. 29, 2024

(65) Prior Publication Data

US 2025/0168439 A1　May 22, 2025

Related U.S. Application Data

(60) Provisional application No. 63/545,363, filed on Oct. 24, 2023.

(51) Int. Cl.
H04N 21/2743　(2011.01)
H04N 21/845　(2011.01)

(52) U.S. Cl.
CPC ..... H04N 21/2743 (2013.01); H04N 21/8456 (2013.01)

(58) Field of Classification Search
None
See application file for complete search history.

(56) References Cited

U.S. PATENT DOCUMENTS

| | | | | |
|---|---|---|---|---|
| 2007/0130015 A1* | 6/2007 | Starr | .................... | H04N 21/858 |
| | | | | 705/14.46 |
| 2008/0275763 A1* | 11/2008 | Tran | .................... | H04N 21/8358 |
| | | | | 705/1.1 |
| 2009/0037967 A1* | 2/2009 | Barkan | .............. | H04N 21/6582 |
| | | | | 725/105 |
| 2009/0327057 A1* | 12/2009 | Redlich | .............. | G06Q 30/0218 |
| | | | | 705/14.2 |
| 2010/0262488 A1* | 10/2010 | Harrison | ............ | H04N 7/17318 |
| | | | | 705/14.46 |
| 2011/0071901 A1* | 3/2011 | Fries | ........................ | G06Q 30/02 |
| | | | | 705/14.48 |
| 2011/0321072 A1* | 12/2011 | Patterson | .............. | H04N 21/432 |
| | | | | 725/5 |
| 2016/0199742 A1* | 7/2016 | McCarthy | .......... | H04N 21/8549 |
| | | | | 463/31 |
| 2017/0024774 A1* | 1/2017 | Sahley | ................ | G06Q 30/0277 |
| 2020/0242576 A1* | 7/2020 | Segal | .................... | G06F 16/951 |
| 2020/0313152 A1* | 10/2020 | Stefanopoulou | .... | H01M 50/578 |
| 2023/0094215 A1* | 3/2023 | Furlotti | ................ | H04N 21/812 |
| | | | | 725/32 |

* cited by examiner

*Primary Examiner* — Alexander Q Huerta

(57)　ABSTRACT

In one aspect, a computerized method for managing a online user-generated video sharing platform comprising: enabling an online user-generated video sharing platform to receive a plurality of uploads of digital videos; dividing a digital video into a plurality of watch time units; monitoring a user watching digital video content; providing a revenue from the advertisement belongs to the creator of the plurality of watch time units, consumer of watch time units and the online user-generated video sharing platform; and sharing the online video-sharing digital platforms shares the revenue based on a specified formula.

1 Claim, 5 Drawing Sheets

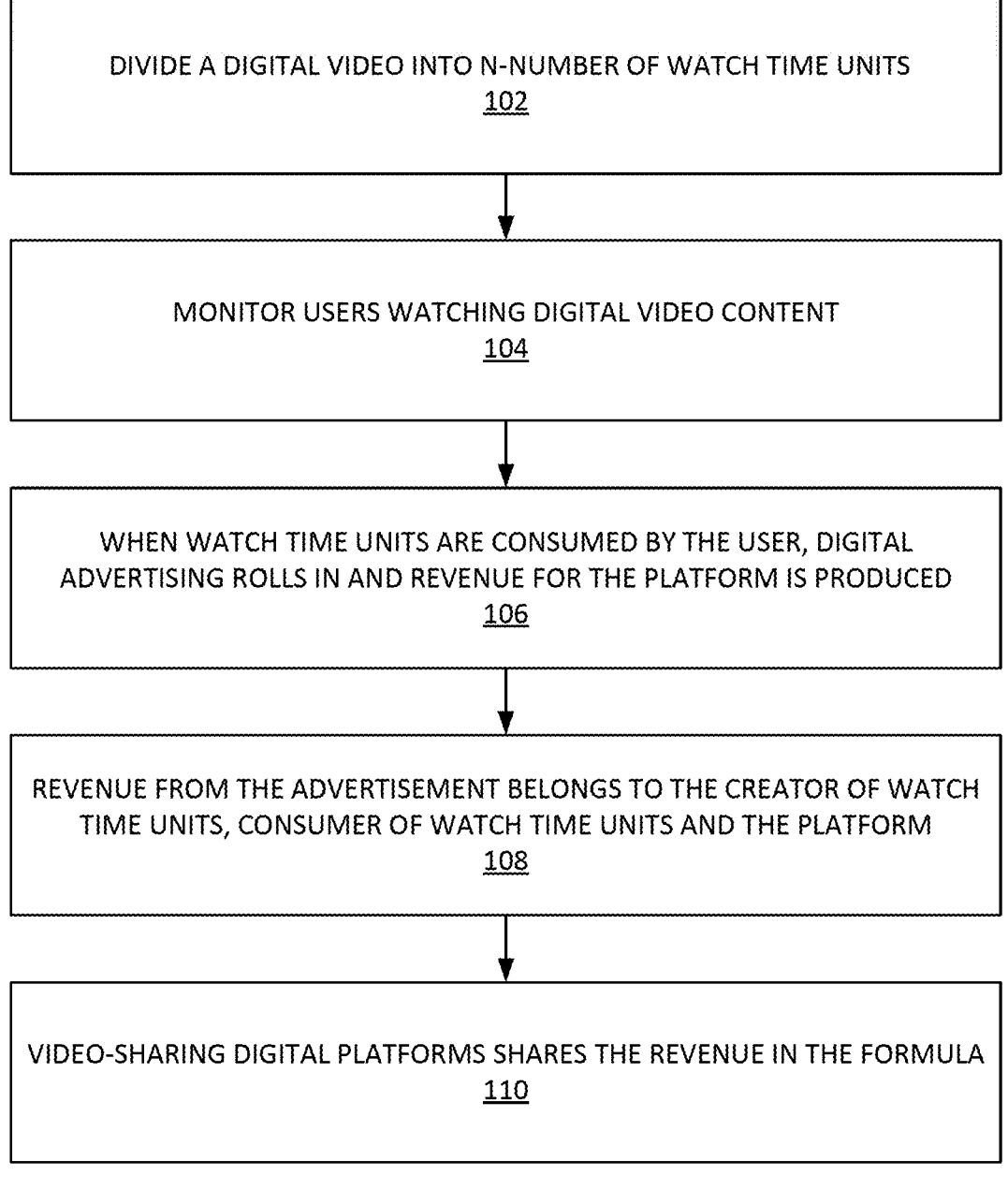

DIVIDE A DIGITAL VIDEO INTO N-NUMBER OF WATCH TIME UNITS
102

MONITOR USERS WATCHING DIGITAL VIDEO CONTENT
104

WHEN WATCH TIME UNITS ARE CONSUMED BY THE USER, DIGITAL ADVERTISING ROLLS IN AND REVENUE FOR THE PLATFORM IS PRODUCED
106

REVENUE FROM THE ADVERTISEMENT BELONGS TO THE CREATOR OF WATCH TIME UNITS, CONSUMER OF WATCH TIME UNITS AND THE PLATFORM
108

VIDEO-SHARING DIGITAL PLATFORMS SHARES THE REVENUE IN THE FORMULA
110

WHEN CREATORS UPLOAD VIDEOS, THEY PRODUCE WATCH TIME UNITS
202

VIEWERS CONSUME WATCH TIME UNITS WHEN THEY WATCH VIDEOS
204

REVENUE IS THEN SHARED BETWEEN THE CREATORS, VIEWERS, AND THE PLATFORM
206

VIEWERS RECEIVE A SHARE OF THE REVENUE BASED ON THE NUMBER OF WATCH TIME UNITS THEY CONSUME
208

200

300

IMPLEMENT AN ADVERTISEMENT REVENUE CAPTURE
502

DETERMINE CREATOR EARNINGS
504

DETERMINE A VIEWER EARNINGS POOL
506

DETERMINE A COUNTRY-SPECIFIC REVENUE AND WATCH TIME CALCULATION
508

DETERMINE A PER UNIT WATCH TIME VALUE CALCULATION
510

IMPLEMENT LOGGED-IN VIEWER TRACKING
512

PROVIDE AN EARNINGS DISTRIBUTION
514

500

WATCH TIME UNITS AND THE REWARD SHARE MECHANISM FOR A USER-GENERATED VIDEO SHARING PLATFORM

CLAIM OF PRIORITY

This application claims priority to U.S. Provisional Patent Application No. 63/545,363, filed on 24 Oct. 2023, and titled WATCH TIME UNITS AND THE REWARD SHARE MECHANISM FOR A USER-GENERATED VIDEO SHARING PLATFORM. This provisional patent application is hereby incorporated by reference in its entirety.

BACKGROUND

The global influencer market has grown tremendously since 2019, now worth over $21 billion this year compared to $16.4 billion in 2022. New trends have arisen as more avid social media users become creators, essential players in the creator economy. Influencer marketing and user generated content are front and center, while traditional marketing techniques, once go-to strategies, have taken a back seat in an economy run by rising creators. With a multitude of responses from anonymous creators, this creator economy report aims to analyze creator economy trends to predict future trends. Accordingly, improvements to watch time units and the reward share mechanism for a user-generated video sharing platform are desired.

BRIEF SUMMARY OF THE INVENTION

In one aspect, a computerized method for managing a online user-generated video sharing platform comprising: enabling an online user-generated video sharing platform to receive a plurality of uploads of digital videos; dividing a digital video into a plurality of watch time units; monitoring a user watching digital video content; providing a revenue from the advertisement belongs to the creator of the plurality of watch time units, consumer of watch time units and the online user-generated video sharing platform; and sharing the online video-sharing digital platforms shares the revenue based on a specified formula.

BRIEF DESCRIPTION OF THE DRAWINGS

FIG. 1 illustrate an example process for managing a user-generated video sharing platform, according to some embodiments.

Figure 2:
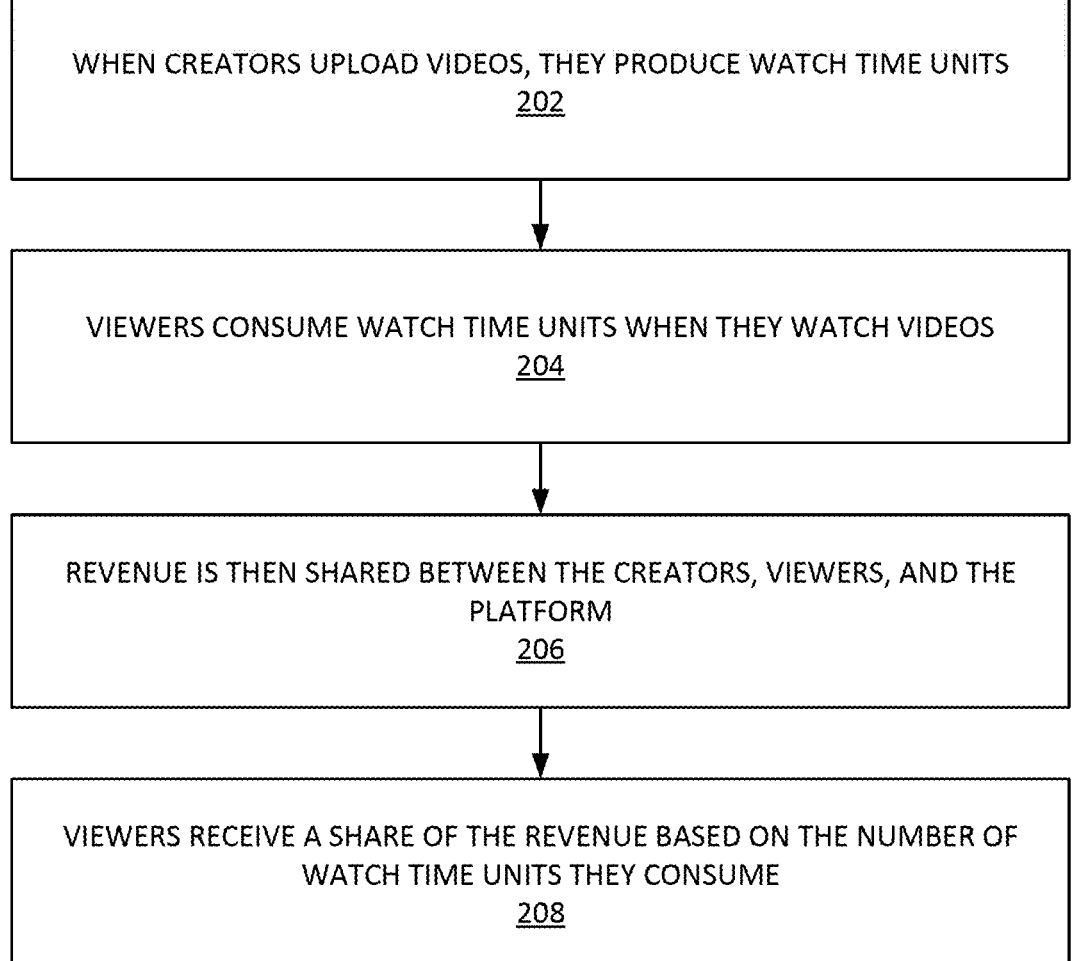
FIG. 2 illustrates an example process for rewards related to watch-time units, according to some embodiments.

The Figures described above are a representative set and are not an exhaustive with respect to embodying the invention.

DESCRIPTION

Disclosed are a system, method, and article of manufacture for watch time units and a reward share mechanism for a user-generated video sharing platform. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment, according to some embodiments. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

DEFINITIONS

Example definitions for some embodiments are now provided.

Cloud computing architecture refers to the components and subcomponents required for cloud computing. These components typically consist of a front-end platform (e.g. fat client, thin client, mobile), back-end platforms (servers, storage), a cloud-based delivery, and a network (e.g. Internet, Intranet, Intercloud). Combined, these components can make up cloud computing architecture. Cloud computing architectures and/or platforms can be referred to as the 'cloud' herein as well.

Online video platform (OVP) enables users to upload, convert, store, and play back video content on the Internet, often via a private server structured, large-scale system that may generate revenue. Users can upload video content via the hosting service's website, mobile or desktop application, or other interfaces (API), and provides embed codes or links that allow others to view the video content.

Social media are interactive technologies that facilitate the creation and sharing of content, ideas, interests, and other forms of expression through virtual communities and networks. While challenges to the definition of social media arise due to the variety of stand-alone and built-in social media services currently available, there are some common features: Social media are interactive Web 2.0 Internet-based applications; User-generated content—such as text posts or comments, digital photos or videos, and data generated through all online interactions—is the lifeblood of social media; Users create service-specific profiles for the website or app that are designed and maintained by the social media organization; and Social media helps the development of online social networks by connecting a user's profile with those of other individuals or groups.

EXAMPLE SYSTEMS AND METHODS

FIG. 1 illustrate an example process 100 for managing a user-generated video sharing platform, according to some embodiments. Process 100 can enable an online user-generated video sharing platform to receive uploads of digital videos. In step 102, process 100 can divide a digital video into n-number of watch time units. When a creator creates video content of a specified time period (e.g. 30 secs or more), it actually produces watch time units. A watch time unit is defined by 30 secs of watch time duration for a video.

In step 104, process 100 monitors users watching digital video content. For example, when a viewer is watching that video content, the user consumes the watch time units being produced. In step 106, when watch time units are consumed by the user, digital advertising rolls in and revenue for the platform is produced.

In step 108, the revenue from the advertisement belongs to the creator of watch time units, consumer of watch time units and the platform. In step 110, the video-sharing digital platforms shares the revenue in the formula. In one example, the revenue sharing model can be as follows:

For $1 revenue produced, users who create the watch time units get a share of X %, 30% of what remains ($1–X % of $1) is rewarded to users who consume the watch time units, and the balance stays with the platform.

FIG. 2 illustrates an example process 200 for rewards related to watch-time units, according to some embodiments. It is noted that watch time units and the reward share mechanism are used to reward creators and viewers for their contributions to a user-generated video sharing platform. When creators upload videos, they produce watch time units in step 202. Viewers consume watch time units when they watch videos in step 204. As viewers consume watch time units, advertising rolls are played, and revenue is generated. This revenue is then shared between the creators, viewers, and the platform in step 206. Creators receive a share of the revenue based on the number of watch time units they produce. Viewers receive a share of the revenue based on the number of watch time units they consume in step 208. The platform retains a balance of the revenue to cover its operating costs. This system is more equitable than traditional revenue sharing mechanisms, which typically favor creators over viewers. By rewarding viewers for their time, watch time units and the reward share mechanism incentivize viewers to watch more videos. This increased viewership benefits both creators and the platform.

Figure 3:
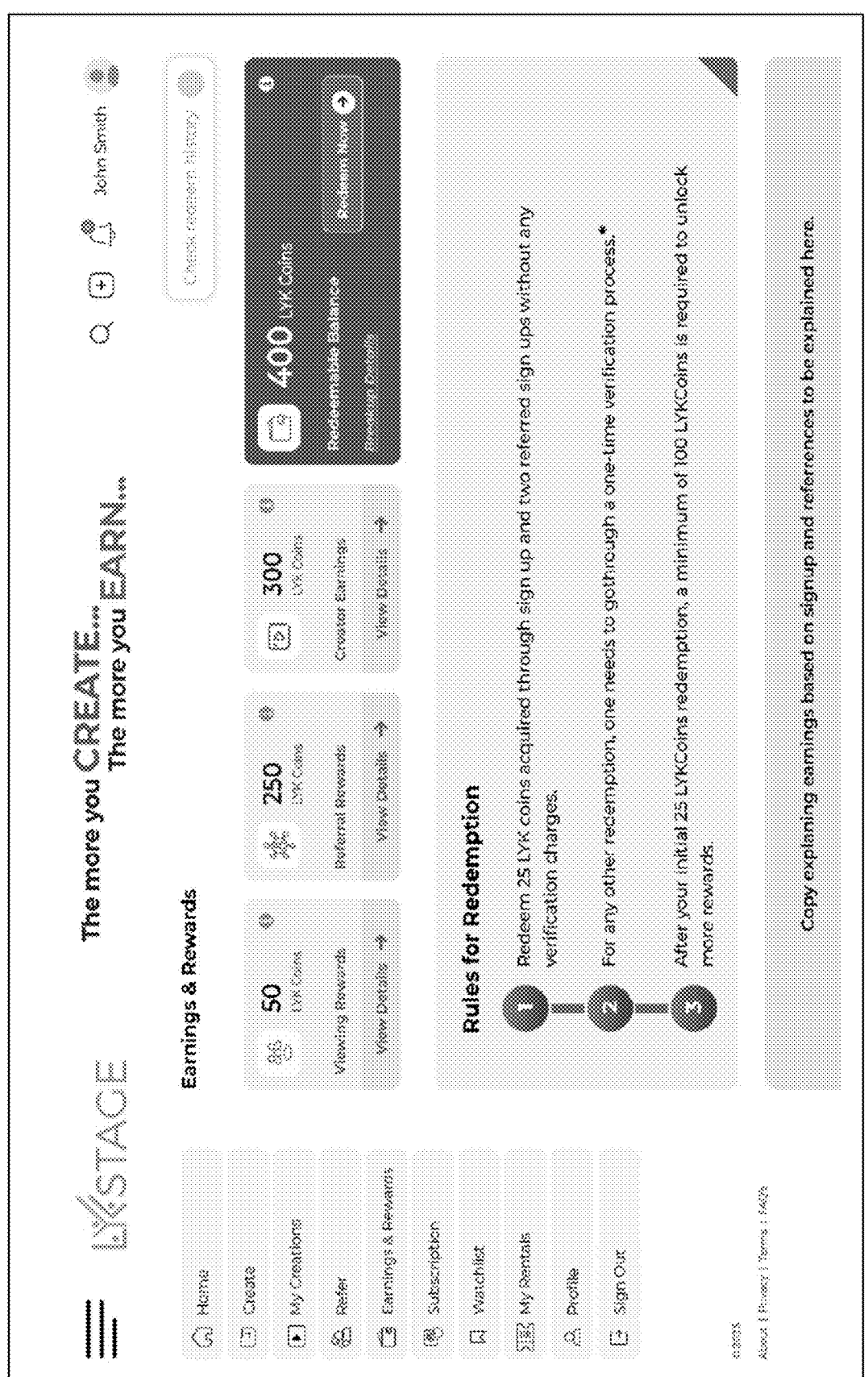
FIG. 3 illustrates an example screenshot of a user-generated video sharing platform, according to some embodiments.

FIG. 3 illustrates an example screenshot 300 of a user-generated video sharing platform, according to some embodiments.

Figure 4:
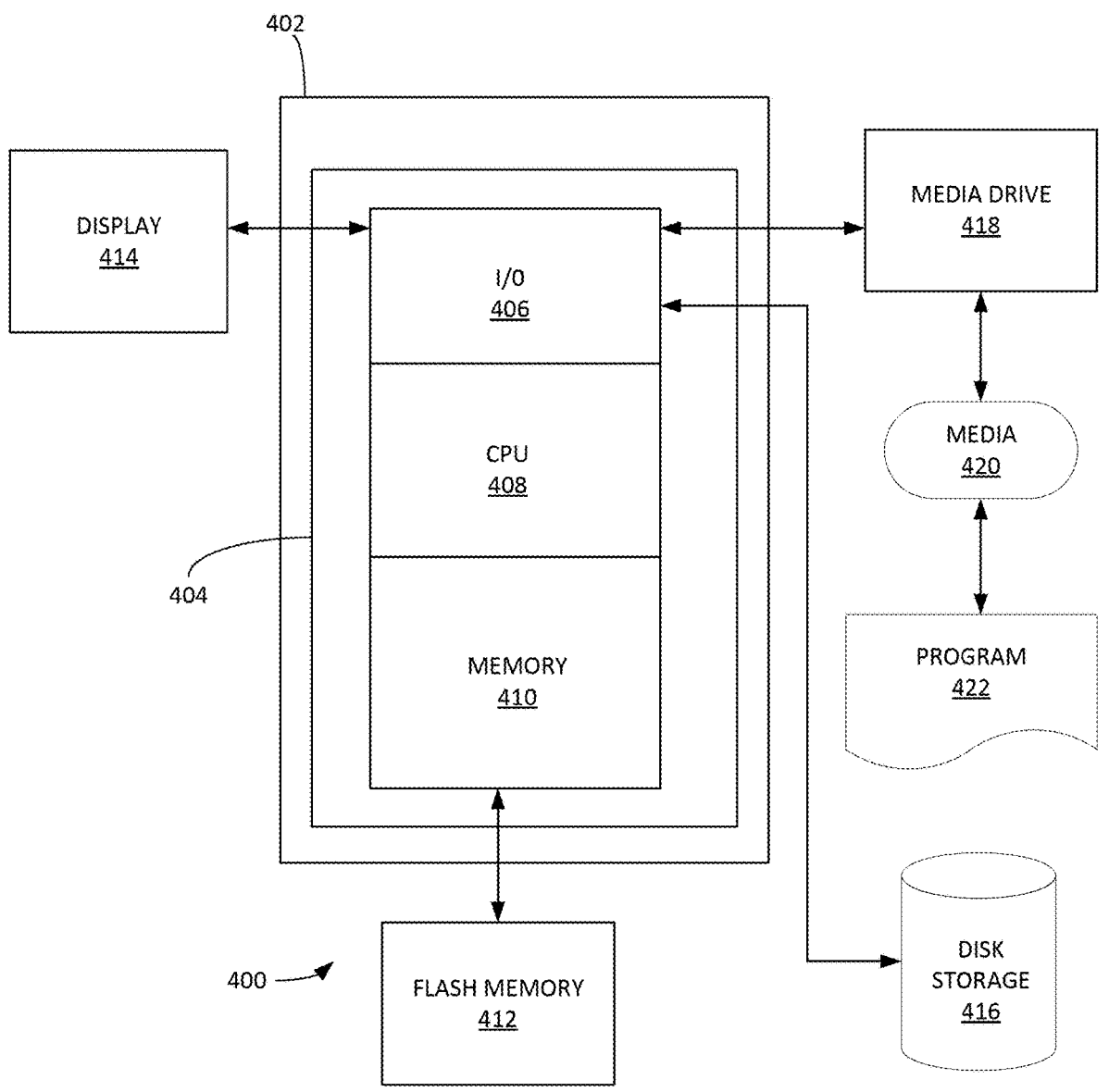
FIG. 4 depicts an exemplary computing system that can be configured to perform any one of the processes provided herein.

FIG. 4 depicts an exemplary computing system 400 that can be configured to perform any one of the processes provided herein. In this context, computing system 400 may include, for example, a processor, memory, storage, and I/O devices (e.g., monitor, keyboard, disk drive, Internet connection, etc.). However, computing system 400 may include circuitry or other specialized hardware for carrying out some or all aspects of the processes. In some operational settings, computing system 400 may be configured as a system that includes one or more units, each of which is configured to carry out some aspects of the processes either in software, hardware, or some combination thereof.

FIG. 4 depicts computing system 400 with a number of components that may be used to perform any of the processes described herein. The main system 402 includes a motherboard 404 having an I/O section 406, one or more central processing units (CPU) 408, and a memory section 410, which may have a flash memory card 412 related to it. The I/O section 406 can be connected to a display 414, a keyboard and/or other user input (not shown), a disk storage unit 416, and a media drive unit 418. The media drive unit 418 can read/write a computer-readable medium 420, which can contain programs 422 and/or data. Computing system 400 can include a web browser. Moreover, it is noted that computing system 400 can be configured to include additional systems in order to fulfill various functionalities. Computing system 400 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

ADDITIONAL EMBODIMENTS

Figure 5:
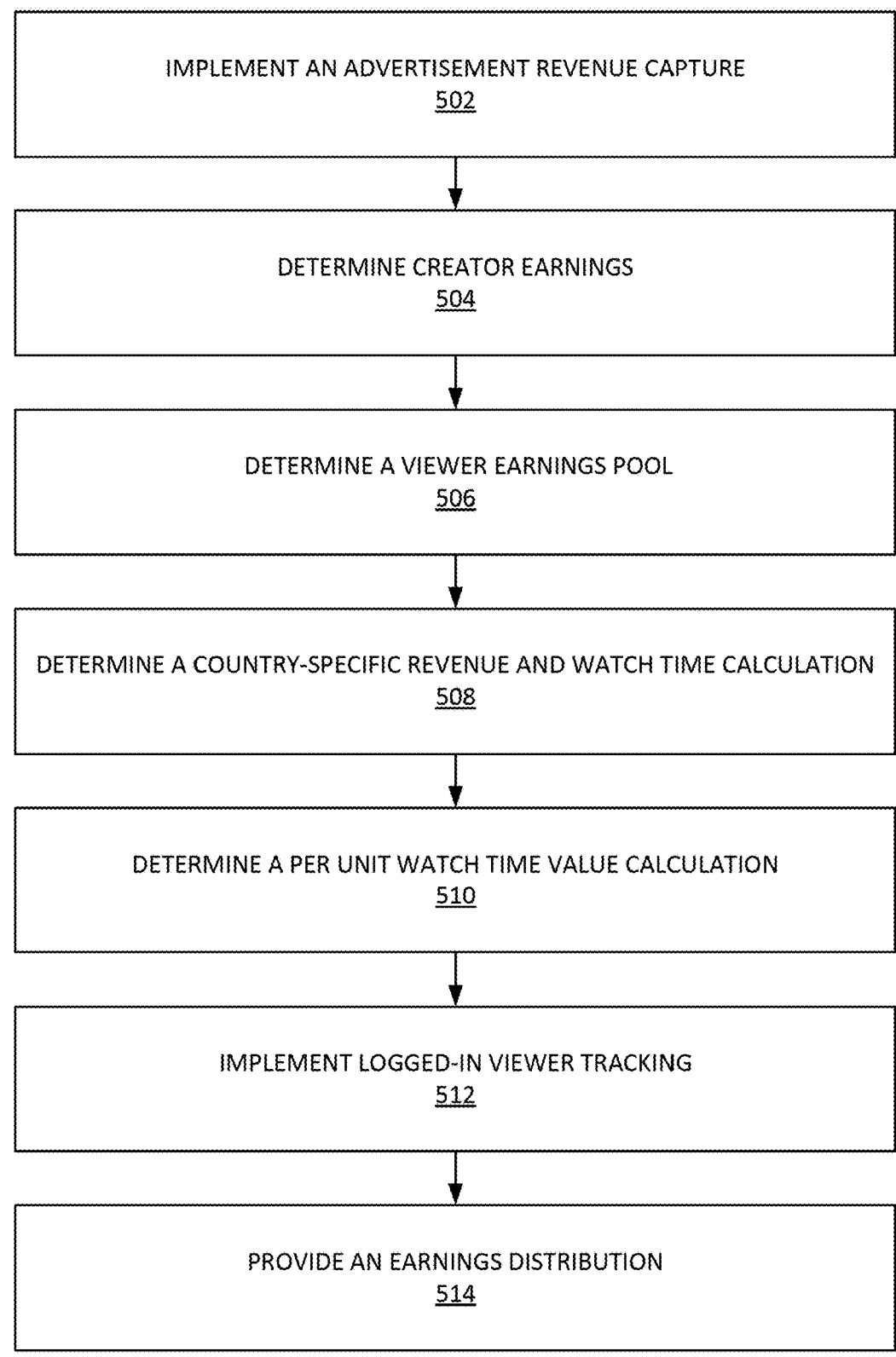
FIG. 5 illustrates an example process for a distribution mechanism of earnings between a creator, a viewer and a user-generated video sharing platform, according to some embodiments.

FIG. 5 illustrates an example process 500 for a distribution mechanism of earnings between a creator, a viewer and a user-generated video sharing platform, according to some embodiments. In step 502, process 500 implements an advertisement revenue capture. For example, every twenty-four (24) hours, process 500 can track the number of advertisements displayed on each piece of content and calculate the total ad revenue based on impressions and views generated by those advertisements.

In step 504, process 500 determine creator earnings. In one example, the total advertisement revenue for the content is determined, and the creator receives their entitled percentage first. In step 506, process 500 determines a viewer earnings pool. From the remaining revenue, thirty percent (30%) can be set aside to reward viewers.

In step 508, process 500 determines a country-specific revenue and watch time calculation. Process 500 can calculate the total advertisement revenue and total watch time units for each country. This can involve determining how much each country has contributed to the total watch time views and the revenue generated from those views.

In step 510, process 500 determines a per unit watch time value calculation. The viewer earnings pool for each country is divided by the total watch time units from that country to determine the value of each watch time unit. In step 512, process 500 implements logged-in viewer tracking. Here, process 500 can identify the logged-in users who watched the content and calculate the total watch time units consumed by these viewers in each country.

In step 514, process 500 can provide an earnings distribution. The total watch time units consumed by logged-in viewers in each country are multiplied by the value of each watch time unit for that country. This determines the total viewer earnings for each country. These earnings are then proportionately distributed to each viewer based on their individual watch time consumption. This method ensures that both creators and viewers are fairly compensated based on the advertisement revenue generated and the watch time contributed in their respective countries. This version incorporates the country-specific calculations for both watch time and revenue, ensuring an accurate distribution of earnings.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed:

1. A computerized method for managing an online user-generated video sharing platform, the method comprising:

enabling the online user-generated video sharing platform to receive a plurality of uploads of digital video content;

dividing each digital video into a plurality of watch time units, wherein each watch time unit is defined by thirty seconds of watch time duration;

monitoring users consuming the digital video content, wherein when a viewer watches the digital video content, the viewer consumes corresponding watch time units;

generating advertising revenue associated with the consumption of the watch time units;

distributing the advertising revenue based on a predefined revenue sharing model, wherein:

(i) when a creator creates a video of a specified time period, a corresponding plurality of watch time units are produced, (ii) users who create the watch time units receive a share of X percent of the advertising revenue, wherein X represents a defined percentage share of the advertising revenue allocated to creators, (iii) thirty percent (30%) of a remainder of the revenue after subtracting X percent is distributed to users who consume the watch time units, and (iv) a remaining balance of the revenue, corresponding to the portion not allocated under (ii) and (iii), is retained by the platform;

wherein the platform performs country-specific calculations to determine total advertisement revenue and total watch time units per country;

wherein the platform determines a per-unit watch time value for each country by dividing a viewer earnings pool for that country by the total watch time units consumed in that country;

and wherein the platform identifies logged-in users who viewed the video content and distributes viewer earnings proportionately based on each logged-in user's individual watch time consumption.

\* \* \* \* \*